R. A. & H. O. HAENKE.
BEAN CHUTE.
APPLICATION FILED FEB. 15, 1909.
939,830.
Patented Nov. 9, 1909.
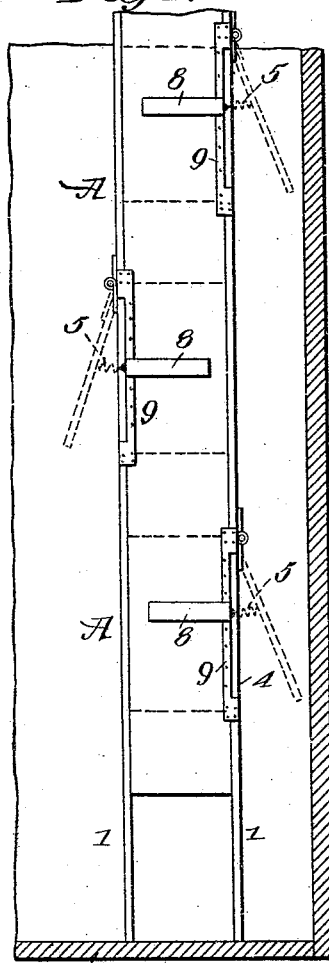
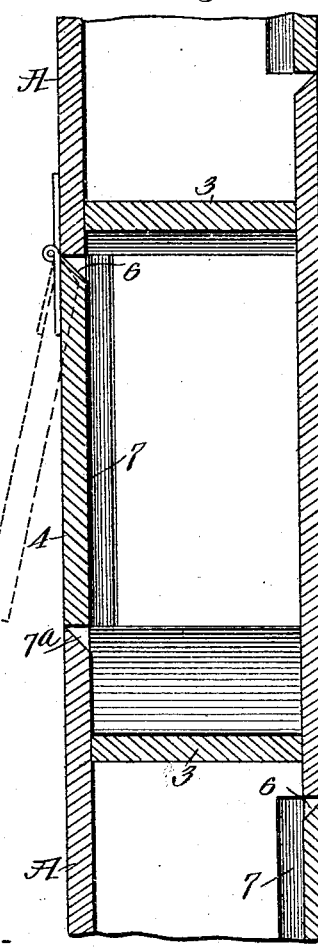
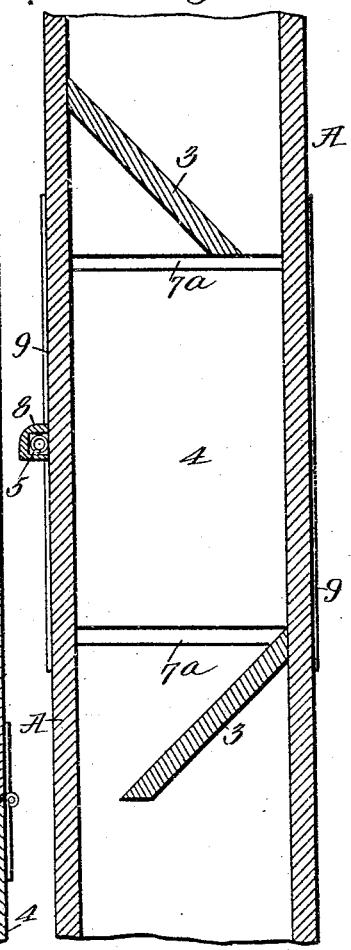
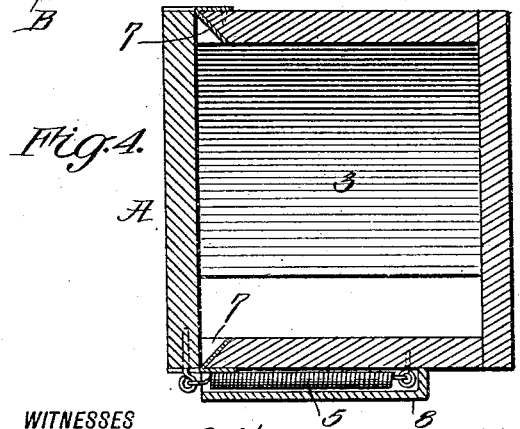
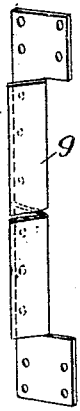
WITNESSES
Samuel E. Wade
Amos W Hart
INVENTORS
RICHARD A. HAENKE
HENRY O. HAENKE
BY Munn & Co.
ATTORNEYS

UNITED STATES PATENT OFFICE.

RICHARD AUGUST HAENKE AND HENRY OTTO HAENKE, OF MOUNT PLEASANT, MICHIGAN.

BEAN-CHUTE.

939,830.

Specification of Letters Patent.

Patented Nov. 9, 1909.

Application filed February 15, 1909. Serial No. 478,142.

*To all whom it may concern:*

Be it known that we, RICHARD A. HAENKE and HENRY O. HAENKE, citizens of the United States, residing at Mount Pleasant, in the county of Isabella, State of Michigan, have invented an Improvement in Bean-Chutes, of which the following is a specification.

Our invention is an improved chute or spout for delivering beans into bins, or other similar receptacles.

If beans are allowed to flow a considerable distance, say twenty to thirty feet, they are liable to be cracked or checked. We have devised a chute which is so constructed that the descent of the beans is in a measure interrupted so that they fall with diminished velocity and are not injured.

Our invention relates particularly to the provision of hinged side doors for relieving pressure within the chute and allowing the lateral discharge of the beans as the bin or other receptacle is filled, the doors and the spring attachment thereof being so applied and arranged as to offer no material obstruction to the withdrawal of the chute from the bin, or other receptacle for beans, when the same has been filled.

The details of construction, arrangement, and operation of parts are as hereinafter described, and illustrated in the accompanying drawing, in which—

Figure 1 is a side view of our improved bean-chute or spout arranged within a bin, which is shown in section. Fig. 2 is a longitudinal section of a portion of the chute. Fig. 3 is another section, taken at right angles to the one shown in Fig. 2. Fig. 4 is a transverse section of the chute. Fig. 5 is a perspective view of a sheet-metal sheathing with which the openings of the chute are provided.

In Fig. 1, the chute A is shown constructed as a rectangular box-like tube arranged vertically within a bin B. The chute is a spout made rectangular in cross-section and provided with feet, or supports, 1 that rest on the bottom of the bin. Interiorly, the chute A is provided with a series of inclined shelves 3 which project alternately from opposite sides, a space being left between their lower edges and the adjacent side of the chute. Thus, beans delivered into the chute and falling therethrough are to a certain extent arrested, and their flow diverted laterally and alternately in opposite directions, so that they are finally delivered at the bottom of the chute without being broken or otherwise injured. As the bin fills, the chute fills also, and it becomes necessary to provide a side delivery. For this purpose we have provided a series of lateral openings, which are provided with hinged doors 4, that are held normally closed flush by means of coiled springs 5; see Figs. 1 and 4. The said doors are hinged at the top of the openings in the side of the chute, and their upper edges 6 are beveled, interiorly, as shown in Fig. 2, in order to prevent beans being caught and pinched when the door is closed; and the side and lower edges of the openings for the doors are similarly beveled at 7 and 7$^a$, as shown in Figs. 2 and 4. The springs 5 are arranged on the outer side of the chute proper and are inclosed and protected by sheathing 8 of any suitable construction. The side edges of the door openings are protected by a metal sheathing 9—see Figs. 1, 4, 5—the same being formed of sheet metal whose middle portion is slitted and turned backward to fit the side bevels 10 of the door openings.

It will be seen that since the doors 4 are hinged at the top and thus hang downward, they will open outward against the tension of the spring, when pressure of the beans within the chute become sufficient, and thus the beans will find a lateral discharge and the doors will be consecutively opened from bottom to top of the chute until the bin is filled; and when the bin is emptied, the doors will close automatically, in the reverse order, so that the chute will be again ready for use.

It will be seen by inspection of Fig. 1 that the openings and doors of the chute are arranged on opposite sides and at regular distances apart. In practice, we prefer to locate them about thirty inches apart. The space between the lower edges of the shelves 3 and the adjacent side of the chute is usually two inches, and the chute itself is generally constructed with a diameter of six inches. These measurements or proportions may of course be varied. The shelves are located between the door openings as will be understood by reference to Fig. 3. The discharge edge of the shelves has an acute angle.

What we claim is:

1. The improved chute for delivering beans into bins or like receptacles, consisting of a box-like tube provided interiorly with inclined shelves and a series of lateral openings arranged between them, and doors for said openings which are hinged at the top and adapted to open outward, and, when closed, are flush with the side of the chute, and spiral springs arranged on the side of said chute and connected with the lower portions of the doors and adapted to hold them normally closed, as described.

2. The improved chute for the purpose specified, consisting of a spout having lateral openings whose lower and side edges are beveled inward, and doors therefor which are hinged at the top and adapted to close in the openings flush with the side of the spout, a spiral spring connected with each door and arranged exteriorly on the side of the chute, and a horizontal sheathing constituting a protector for the spring, as shown and described.

RICHARD AUGUST HAENKE.
HENRY OTTO HAENKE.

Witnesses:
KATHERINE A. FRASER,
LEVI BOHLS.